United States Patent
Ko et al.

(10) Patent No.: US 8,189,706 B2
(45) Date of Patent: May 29, 2012

(54) APPARATUS AND METHOD FOR GENERATING PER STREAM EFFECTIVE SIGNAL TO NOISE RATIO IN A MULTIPLE-INPUT MULTIPLE-OUTPUT WIRELESS COMMUNICATION SYSTEM

(75) Inventors: Eun-Seok Ko, Seongnam-si (KR);
Yung-Soo Kim, Seongnam-si (KR);
Myeon-Kyun Cho, Seongnam-si (KR);
Eun-Yong Kim, Hwaseong-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 730 days.

(21) Appl. No.: 12/186,160

(22) Filed: Aug. 5, 2008

(65) Prior Publication Data
US 2009/0041152 A1 Feb. 12, 2009

(30) Foreign Application Priority Data

Aug. 8, 2007 (KR) .................. 10-2007-0079523

(51) Int. Cl.
*H04B 7/02* (2006.01)
(52) U.S. Cl. ........ 375/267; 375/260; 375/299; 375/347; 375/349; 375/348
(58) Field of Classification Search .................. 375/267, 375/260, 299, 347, 349, 348
See application file for complete search history.

(56) References Cited

U.S. PATENT DOCUMENTS

| | | | |
|---|---|---|---|
| 2006/0146950 A1* | 7/2006 | Hoo | 375/267 |
| 2007/0089024 A1* | 4/2007 | Yu | 714/758 |
| 2007/0162827 A1* | 7/2007 | Walton et al. | 714/774 |
| 2007/0165738 A1 | 7/2007 | Barriac et al. | |

FOREIGN PATENT DOCUMENTS

KR 10-2006-0015982 A 2/2006

* cited by examiner

*Primary Examiner* — Kabir A Timory
(74) *Attorney, Agent, or Firm* — Jefferson IP Law, LLP (57) ABSTRACT

In the present invention, an apparatus and a method for generating feedback information for a Maximum Likelihood (ML) detection scheme in a Multiple-Input Multiple-Output (MIMO) wireless communication system are provided. An apparatus of the invention includes a generator for generating constellation difference points by converting a constellation domain representing values of symbols into a constellation difference domain representing values of distance between symbols, a calculator for calculating per stream Symbol Error Rates (SERs) using the constellation difference points, and a determiner for determining per stream Effective Signal to Noise Ratios (ESNRs) using the per stream SER.

24 Claims, 8 Drawing Sheets

: TRANSFORMED CONSTELLATION DIFFERENCE POINT

: CONSTELLATION DIFFERENCE POINT $$\begin{matrix} 1^{ST}\text{STREAM} \\ 2^{ND}\text{STREAM} \end{matrix} \begin{bmatrix} 1 \\ 1 \end{bmatrix} \begin{bmatrix} -1 \\ 1 \end{bmatrix} \begin{bmatrix} 1 \\ -1 \end{bmatrix} \begin{bmatrix} -1 \\ -1 \end{bmatrix}$$

1ST SYMBOL VECTOR   2ND SYMBOL VECTOR   3RD SYMBOL VECTOR   4TH SYMBOL VECTOR

FIG.1

$$\overset{S_1}{\begin{bmatrix} 1 \\ 1 \end{bmatrix}} \quad \overset{S_2}{\begin{bmatrix} -1 \\ 1 \end{bmatrix}} \quad \overset{S_3}{\begin{bmatrix} 1 \\ -1 \end{bmatrix}} \quad \overset{S_4}{\begin{bmatrix} -1 \\ -1 \end{bmatrix}}$$

FIG.2A $$\overset{\delta_1}{\begin{bmatrix} 2 \\ 0 \end{bmatrix}} \quad \overset{\delta_2}{\begin{bmatrix} 2 \\ 2 \end{bmatrix}} \quad \overset{\delta_3}{\begin{bmatrix} 2 \\ -2 \end{bmatrix}} \quad \overset{\delta_4}{\begin{bmatrix} -2 \\ 0 \end{bmatrix}} \quad \overset{\delta_5}{\begin{bmatrix} -2 \\ -2 \end{bmatrix}} \quad \overset{\delta_6}{\begin{bmatrix} -2 \\ 2 \end{bmatrix}}$$

APPARATUS AND METHOD FOR GENERATING PER STREAM EFFECTIVE SIGNAL TO NOISE RATIO IN A MULTIPLE-INPUT MULTIPLE-OUTPUT WIRELESS COMMUNICATION SYSTEM

PRIORITY

This application claims the benefit under 35 U.S.C. §119(a) of a Korean patent application filed in the Korean Intellectual Property Office on Aug. 8, 2007 and assigned Serial No. 2007-79523, the entire disclosure of which is hereby incorporated by reference.

BACKGROUND OF THE INVENTION

1. Field of the Invention

The present invention relates to a Multiple-Input Multiple-Output (MIMO) wireless communication system. More particularly, the present invention relates to an apparatus and a method for generating per stream Effective Signal to Noise Ratios (ESNRs) for a Maximum Likelihood (ML) detection in the MIMO wireless communication system.

2. Description of the Related Art

Over time, the demand for high-speed and high-quality data transmission in a wireless communication system has grown. To meet these increasing demands, a Multiple-Input Multiple-Output (MIMO) wireless communication system using a plurality of transmit antennas and a plurality of receive antennas is attracting attention. In a MIMO system, communications are performed using a plurality of streams via the multiple antennas. Compared to a single antenna, the channel capacity in a MIMO system is greatly enhanced. For example, in a MIMO system in which the transmitting end uses M-ary transmit antennas, the receiving end uses M-ary receive antennas, channels between the antennas are independent of each other, and the bandwidth and the entire transmit power are fixed, the average channel capacity is increased M times as compared to a single antenna.

There are various detection schemes for detecting the intended signals from among the signals received at the receive antennas in a MIMO system. Among the various detection schemes, a Maximum Likelihood (ML) detection scheme exhibits the highest performance. As compared to a linear scheme, such as Minimum Mean Square Error (MMSE) detection scheme that provides a diversity gain less than the number of the receive antennas, the ML detection scheme guarantees a diversity gain equal to the number of the receive antennas. However, the ML detection scheme has very high operational complexity which complicates its applications in spite of its optimum performance.

Recently, research is being conducted to provide a detection scheme having lower operational complexity while having performance close to the ML detection scheme. As a result, various approaches such as QR Decomposition-Modified Maximum Likelihood Detector (QRM-MLD), Recursive Modified Maximum Likelihood (RMML), and Sorted-RMML (S-RMML) are suggested. However, those approaches pertain to MIMO technology using an Open Loop (OL). That is, the above-mentioned approaches do not consider how to utilize feedback information from the receiving end or how to generate the feedback information. To apply the ML detection to the MIMO technology using a Closed Loop (CL), a method for generating the feedback information suitable for the ML detection is needed.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for generating feedback information for a Maximum Likelihood (ML) detection scheme in a Multiple-Input Multiple-Output (MIMO) wireless communication system.

Another aspect of the present invention is to provide an apparatus and a method for generating per stream Effective Signal to Noise Ratios (ESNRs) for an ML detection scheme in a MIMO wireless communication system.

Yet another aspect of the present invention is to provide an apparatus and a method for decreasing operational complexity of generating the per stream ESNRs by using constellation difference domain for an ML detection scheme in a MIMO wireless communication system.

In accordance with an aspect of the present invention, a receiving end in a MIMO wireless communication system is provided. The receiving end includes a generator for generating constellation difference points by converting a constellation domain representing values of symbols into a constellation difference domain representing values of distance between symbols, a calculator for calculating per stream Symbol Error Rates (SERs) using the constellation difference points, and a determiner for determining per stream Effective Signal to Noise Ratios (ESNRs) using the per stream SERs.

In accordance with another aspect of the present invention, an operating method of a receiving end in a MIMO wireless communication system is provided. The method includes generating constellation difference points by converting constellation domain representing values of symbols into constellation difference domain representing values of distance between symbols, calculating per stream Symbol Error Rates (SERs) using the constellation difference points, and determining per stream Effective Signal to Noise Ratios (ESNRs) using the per stream SERs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a technique for generating per stream Effective Signal to Noise Ratios (ESNRs) for a Maximum Likelihood (ML) detection in a Multiple-Input Multiple-Output (MIMO) wireless communication system.

An exemplary technique for generating per stream ESNRs is illustrated below by referring to equations.

It is assumed that a transmitting end includes $N_T$-ary transmit antennas and a receiving end includes $N_R$-ary receive antennas. $N_{T,eff}$ denotes the number of effective streams actually used among transmittable $N_T$-ary streams, and $N_{T,eff}$ is smaller than or equal to $N_T$. The variable s denotes a symbol vector with the magnitude $N_{T,eff} \times 1$ carried by the $N_{T,eff}$-ary streams. The variable $M_{TX}(m)$ denotes a modulation order of the m-th element of the symbol vector s. Herein, $M_{TX}(m)$ is determined by the per stream ESNR.

The relation between the transmit signal of the transmitting end and the receive signal of the receiving end is expressed as Equation (1).

$$r = W_R H W_T P_T s + n = H_{eff} s + n \quad (1)$$

In Equation (1), r denotes a receive symbol vector, $W_R$ denotes a receive weight matrix, H denotes a channel matrix, $W_T$ denotes a transmit weight matrix for the precoding or the beamforming, $P_T$ denotes a diagonal matrix for allocating transmit powers, s denotes a transmit symbol vector, n denotes a noise vector, and $H_{eff}$ denotes an effective channel matrix.

A signal detecting operation of the receiving end can be expressed as Equation (2).

$$\hat{s} = \min_{\hat{s} \in S_{set}} \left\| r - \hat{H}_{eff} \hat{s} \right\|^2 \quad (2)$$

In Equation (2), $\hat{s}$ denotes an estimated transmit symbol vector, $S_{set}$ denotes a transmittable symbol vector set, r denotes the receive symbol vector, $\hat{H}_{eff}$ denotes an estimated effective channel matrix, and $\|\cdot\|^2$ is a vector norm operator.

The transmittable symbol vector set is determined by the modulation orders for each stream. For example, when $N_{T,eff}$ is 2 and $M_{TX}(1)$ and $M_{TX}(2)$ are Binary Phase Shift Keying (BPSK), $S_{set}$ is $\{[1,1]^T, [1,-1]^T, [-1,1]^T, [-1,-1]^T\}$. One of the elements of $S_{set}$ is set to a final transmit symbol vector based on Equation (2). As expressed in Equation (2), an exemplary ML detection scheme detects the symbols by regarding the symbol vector as one unit, rather than detecting the symbol by stream.

According to this property of the ML detection scheme, a Pairwise Error Rate (PER) is calculated and then per stream Symbol Error Rates (SERs) are calculated based on the PER. Herein, the PER indicates the error rate of the symbol vector and the SER indicates the symbol error rate for a stream.

Hereafter, $M_{set}$ denotes a modulation order set. For example, when the available modulation scheme includes BPSK, $M_{set}$ is $\{[BPSK, BPSK]\}$. Furthermore, $S_{set}(M_{set})$ denotes a transmit symbol vector set according to $M_{set}$, and $\hat{s}_{1,i}$ denotes the i-th element of $S_{set}(M_{set})$. For example, when $M_{set}$ is $\{[BPSK, BPSK]\}$, $S_{set}(M_{set})$ is $\{[1,1]^T, [1,-1]^T, [-1,1]^T, [-1,-1]^T\} \cdot \hat{s}_{1,1}$ is $[1,1]^T$, $\hat{s}_{1,2}$ is $[1,-1]^T$, and $\hat{s}_{1,3}$ is $[-1,1]^T$, and $\hat{s}_{1,4}$ is $[-1,-1]^T$. As such, every transmittable symbol vector set is determined with respect to every modulation scheme.

Using the above-mentioned variables, the PER between all the transmittable $\hat{s}_{1,i}$s is expressed as Equation (3).

$$P(\hat{s}_i \to \hat{s}_j \mid \hat{H}_{eff}) = Q\left( \sqrt{\frac{E_s}{2\sigma_n^2} d_{ij}^2(\hat{H}_{eff})} \right) \quad (3)$$

In Equation (3), $P(\hat{s}_i \to \hat{s}_j \mid \hat{H}_{eff})$ denotes a probability of misjudging $\hat{s}_i$ as $\hat{s}_j$ when the effective channel matrix is $\hat{H}_{eff}$, $Q(\cdot)$ denotes a Gaussian Q function, $E_s$ denotes a sum of the transmit powers of the streams, $\sigma_n^2$ denotes a noise power, and $d_{ij}^2(\hat{H}_{eff})$ denotes an effective distance of $\hat{s}_i$ and $\hat{s}_j$. Furthermore, $d_{ij}^2(\hat{H}_{eff})$ denotes a distance between two transmit symbol vectors multiplied by the effective channel matrix in a constellation; that is, a distance between the two receive symbol vectors passing through the effective channel matrix in the constellation. More specifically, $d_{ij}^2(\hat{H}_{eff})$ is defined as $\|\hat{H}_{eff}(\hat{s}_i - \hat{s}_j)\|_F^2$.

Figure 1:
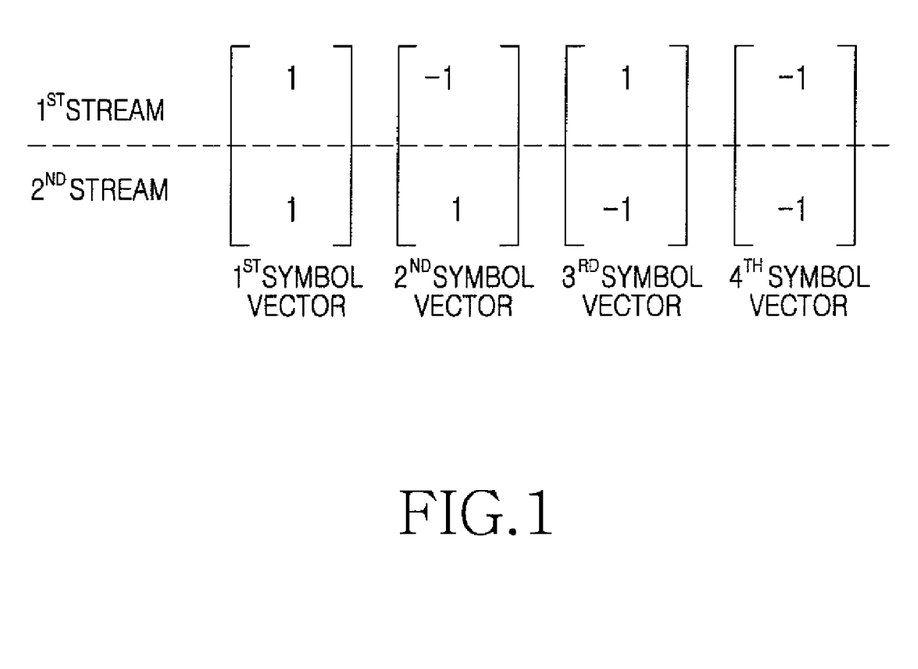
FIG. 1 is a diagram of a transmit symbol combination in a MIMO wireless communication system.

Based on Equation 3, the PER is calculated for the instantaneous effective channel matrix $\hat{H}_{eff}$. However, since the PER is error information of the symbol vector, it does not represent per stream symbol error information. For example, the symbol error occurs in the first stream only in two of the three cases of the pairwise error in the first symbol vector as shown in FIG. 1. That is, the pairwise error occurrence does not include the symbol error occurrence of a specific stream. Hence, an exemplary embodiment of the present invention calculates the per stream SERs using the PER based on Equation (3). A union bound of the SER is calculated based on Equation (4).

$$P_s(m \mid \hat{H}_{eff}) \le \sum_i P(\hat{s}_i) \sum_{i \ne j} k_m(\hat{s}_i, \hat{s}_j) P(\hat{s}_i \to \hat{s}_j \mid \hat{H}_{eff}) + f_m(e, \hat{H}_{eff}), \quad (4)$$

In Equation (4), $P_s(m \mid \hat{H}_{eff})$ denotes the SER of the m-th stream of $M_{set}$ when the effective channel matrix is $\hat{H}_{eff}$, $P(\hat{s}_i)$ denotes a probability of transmitting $\hat{s}_i$, $k_m(\hat{s}_i, \hat{s}_j)$ denotes a variable indicating whether the symbols of the m-th stream in $\hat{s}_i$ and $\hat{s}_j$ are different, $P(\hat{s}_i \to \hat{s}_j \mid \hat{H}_{eff})$ denotes the probability of misjudging $\hat{s}_i$ as $\hat{s}_j$ when the effective channel matrix is $\hat{H}_{eff}$, and $f_m(e, \hat{H}_{eff})$ denotes a compensation value of the error component of the m-th stream according to the estimation error of the effective channel matrix.

Specifically, provided that $N_{T,eff}$ is 2 as shown in FIG. 1, the modulation scheme is (BPSK, BPSK), $f_m(e, \hat{H}_{eff})$ for every m is zero, and $P(\hat{s}_i)$ is constant for every i, $k_m(\hat{s}_i,\hat{s}_j)$ for every m, every i, and every j is expressed as Equation (5).

$$k_1(\hat{s}_1,\hat{s}_2)=1, k_1(\hat{s}_{l,1},\hat{s}_{l,3})=0$$

$$k_1(\hat{s}_1,\hat{s}_4)=1, k_1(\hat{s}_2,\hat{s}_3)=1$$

$$k_1(\hat{s}_2,\hat{s}_4)=0, k_1(\hat{s}_3,\hat{s}_4)=1$$

$$k_2(\hat{s}_1,\hat{s}_2)=0, k_2(\hat{s}_1,\hat{s}_3)=1$$

$$k_2(\hat{s}_1,\hat{s}_4)=1, k_2(\hat{s}_2,\hat{s}_3)=1$$

$$k_2(\hat{s}_2,\hat{s}_4)=1, k_2(\hat{s}_3,\hat{s}_4)=0 \quad (5)$$

$k_m(\hat{s}_i,\hat{s}_j)$ denotes a variable indicating whether the symbols of the m-th stream in $\hat{s}_i$ and $\hat{s}_j$ are different or not.

To calculate the per stream SERs based on Equation (4), effective distance values of all combinations of $\hat{s}_i$ and $\hat{s}_j$ need to be calculated. In this case, when the modulation order and the number of streams are increased, the number of combinations of $\hat{s}_i$ and $\hat{s}_j$ is sharply increased. In other words, operational complexity is sharply increased. To prevent increasing the operational complexity, a constellation difference domain is employed. Since the effective distance denotes difference $\hat{s}_i$ and $\hat{s}_j$, the effective distance might be calculated by using a constellation difference domain based on Equation (6) below.

$$d_{ij}^2(\hat{H}_{eff}) = \|\hat{H}_{eff}(\hat{s}_i - \hat{s}_j)\|_F^2 = \|\hat{H}_{eff}\delta_k\|_F^2, \quad (6)$$

In Equation (6), $\hat{H}_{eff}$ denotes an effective channel matrix, $d_{ij}^2(\hat{H}_{eff})$ denotes an effective distance of $\hat{s}_i$ and $\hat{s}_j$, and $\delta_k$ denotes a constellation difference domain vector consisting of a difference between constellation points as elements.

Figure 2A:
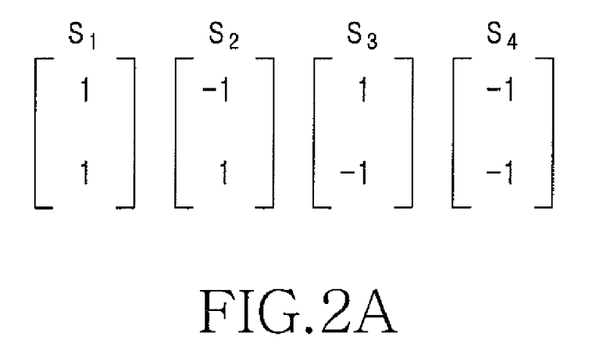
FIG. 2A and FIG. 2B are diagrams illustrating a relation between a modulation scheme and a constellation difference in a MIMO wireless communication system.
Figure 2B:
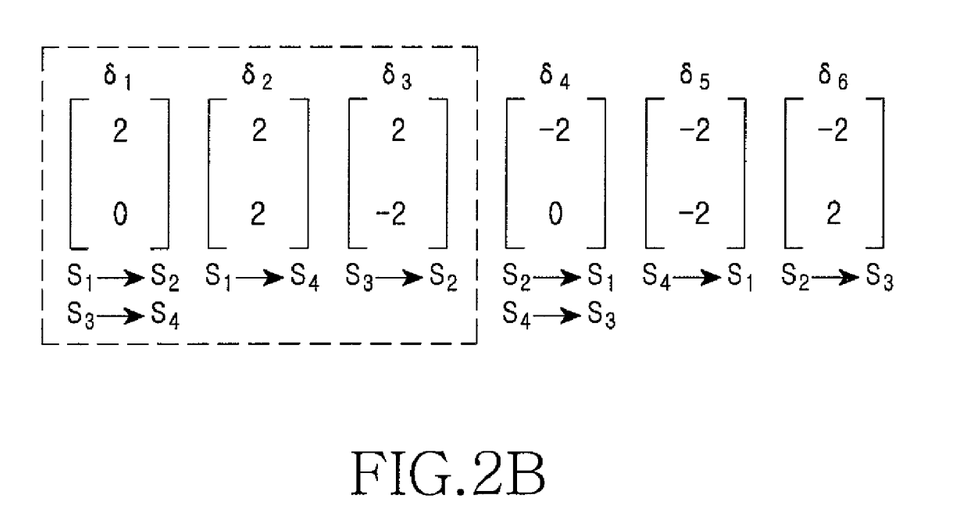

In the case that the modulation scheme is BPSK and the number of streams is 2 as illustrated in FIG. 2A, the result of calculating $\delta_k$ is illustrated in FIG. 2B. Referring to FIG. 2B, there are 4 of $\hat{s}_i$ and 4 of $\hat{s}_j$. Hence, if the per stream SERs is calculated based on Equation (4) without using the constellation difference domain, calculating the effective distance must be performed 12 times. However, 12 effective distance values are represented by a constellation difference domain vector $\delta_k$ consisting of 6 elements by converting the constellation domain into a constellation difference domain. Furthermore, by adjusting elements having the same absolute value among the 6 elements, only 3 elements within the dot-lined box remain. That is, 12 operations are reduced by 3 operations, which are one forth the amount of 12 operations. As described above, Equation (4) is converted into Equation (7) by employing the constellation difference domain.

$$P_s(m | \hat{H}_{eff}) \leq \frac{1}{\prod_{i=1}^{N_T} M_{TX}(i)} \sum_{k=1}^{N(\delta_k)} k_m(\delta_k)\zeta(\delta_k)P(\delta_k | \hat{H}_{eff}) + f_m(e, \hat{H}_{eff}), \quad (7)$$

$$P(\delta_k | \hat{H}_{eff}) = Q\left(\sqrt{\frac{E_s}{2\sigma_n^2}\|\hat{H}_{eff}\delta_k\|_F^2}\right),$$

In Equation (7), $P_s(m|\hat{H}_{eff})$ denotes the SER of the m-th stream of $M_{set}$ when the effective channel matrix is $\hat{H}_{eff}$, $N_T$ denotes the number of transmit antennas, $M_{TX}(i)$ denotes a modulation order of the i-th stream, $\delta_k$ denotes a constellation difference domain vector, $N(\delta_k)$ denotes the number of constellation difference vectors, $k_m(\delta_k)$ denotes whether the m-th constellation difference vector is 0, if the m-th constellation difference vector is 0 then $k_m(\delta_k)$ is 0, $\zeta(\delta_k)$ denotes generating rates of $\delta_k$, $f_m(e,\hat{H}_{eff})$ denotes a compensation value of the error component of the m-th stream according to the estimation error of the effective channel matrix, $E_s$ denotes a sum of the transmit powers of the streams, and $\sigma_n^2$ denotes a noise power.

When $f_m(e,\hat{H}_{eff})$ for every m is zero, and the transmit probability of $\hat{s}_i$ for every i is the same, Equation (7) is represented Equation (8) below.

$$P_s(1 | \hat{H}_{eff}) \leq \frac{1}{4}(4P(\delta_1 | \hat{H}_{eff}) + 2P(\delta_2 | \hat{H}_{eff}) + 2P(\delta_3 | \hat{H}_{eff})), \quad (8)$$

$$P(\delta_k | \hat{H}_{eff}) = Q\left(\sqrt{\frac{E_s}{2\sigma_n^2}\|\hat{H}_{eff}\delta_k\|_F^2}\right),$$

In Equation (8), $P_s(m|\hat{H}_{eff})$ denotes the SER of the m-th stream of $M_{set}$ when the effective channel matrix is $\hat{H}_{eff}$, $E_s$ denotes a sum of the transmit powers of the streams, $\sigma_n^2$ denotes a noise power, and $\delta_k$ denotes a constellation difference domain vector.

Figure 3:
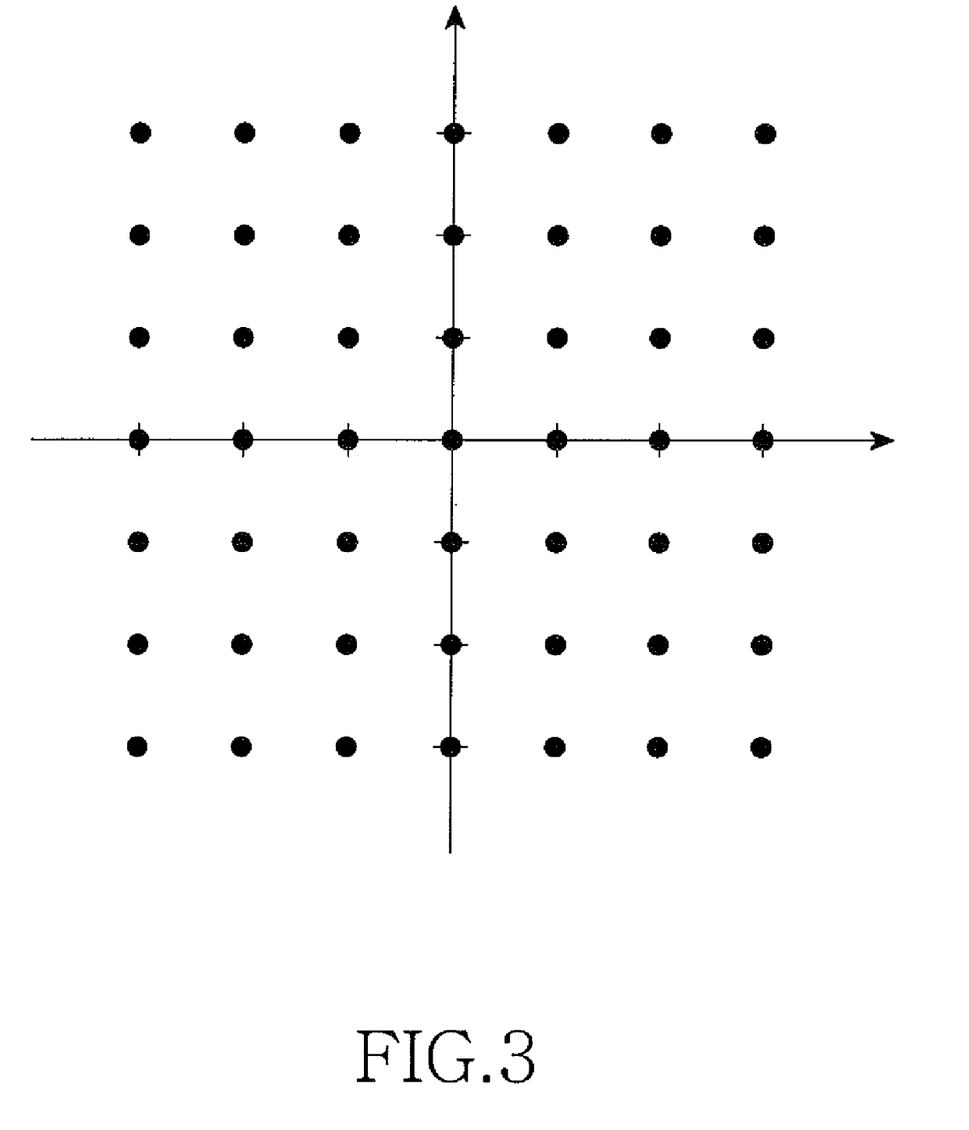
FIG. 3 is a diagram of constellation difference points in a MIMO wireless communication system.

By converting a constellation domain into the constellation difference domain, operational complexity is decreased. However, although the constellation difference domain is employed, the operational complexity grows higher as the modulation order goes higher. That is, the operational complexity largely depends on the number of constellation difference points. Herein, constellation difference points refers to points representing values which are obtained by subtracting 2 constellation points. For instance, when 16-QAM is employed, the number of constellation difference points is 49 as illustrated in FIG. 3. When 64-QAM is employed, the number of constellation difference points is 225. Therefore, to further reduce operational complexity, exemplary embodiments of the present invention suggest a way of transforming constellation difference points to reduce the number of constellation difference points. Herein, transformed constellation difference points are subject to the condition which is represented by Equation (9) below.

$$\min N(\delta'_k) \text{ subject to } |P_s(m|\hat{H}_{eff}) - P_s^{new}(m|\hat{H}_{eff})| < \epsilon, \quad (9)$$

In Equation (9), $\delta'_k$ denotes a constellation difference domain vector consisting of transformed constellation difference points as elements, $N(\delta'_k)$ denotes the number of transformed constellation difference points, $P_s(m|\hat{H}_{eff})$ denotes the SER of an m-th stream when constellation difference points are used, and $P_s^{new}(m|\hat{H}_{eff})$ denotes the SER of m-th stream when transformed constellation difference points are used.

Referring to Equation (9), constellation difference points are needed to be transformed so that the number of difference points is minimized within an allowable range of error probability per stream. If the condition represented in Equation (9) is satisfied when constellation difference points are transformed, operational complexity is decreased and an error due to the transformation is minimized. However, a large amount of computation is required to transform the constellation difference points based on Equation (9). Accordingly, exemplary embodiments of the present invention suggest a way of intuitively decreasing the amount of computation to transform the constellation difference points.

Figure 4:
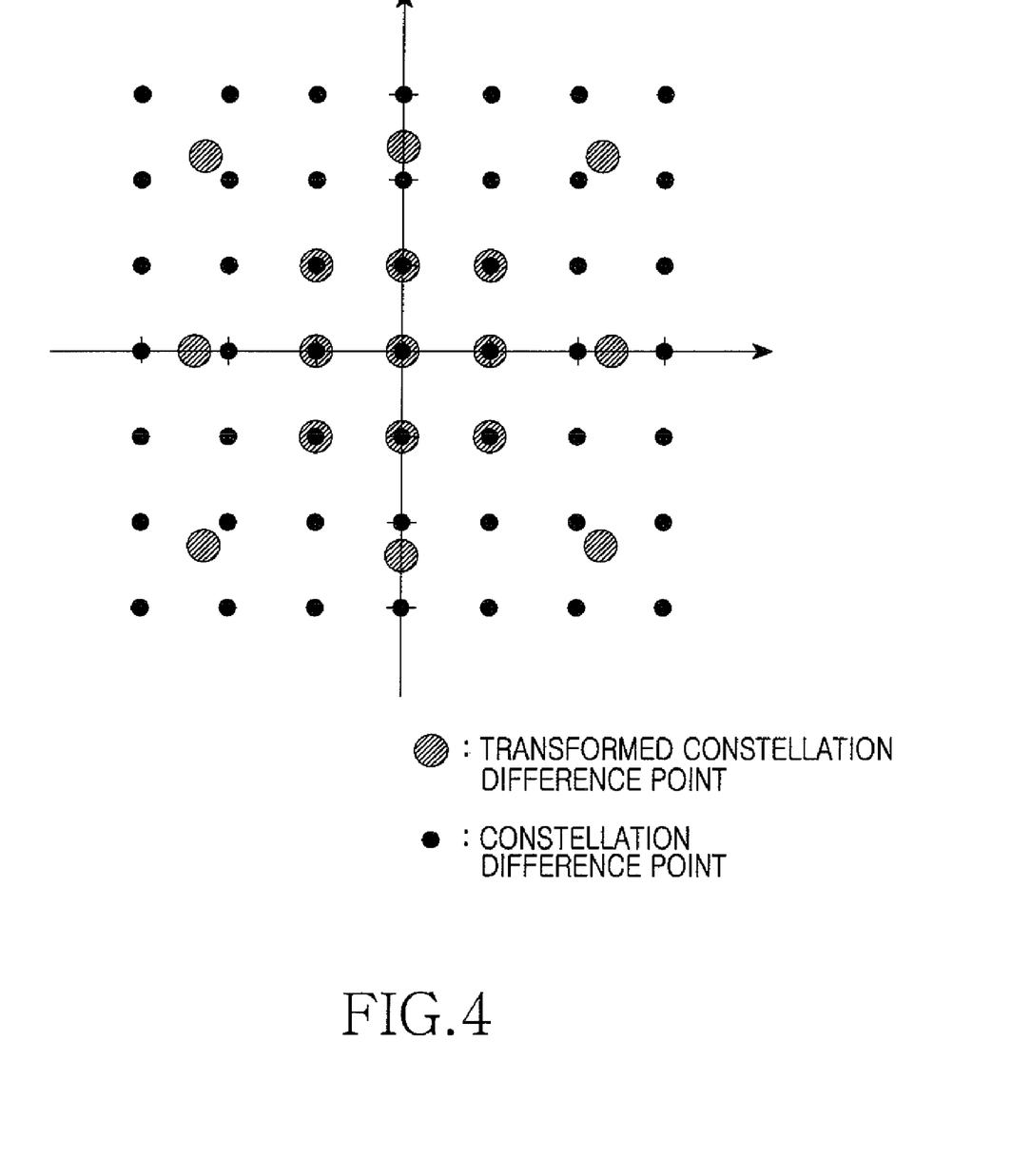
FIG. 4 is a diagram of transformed constellation difference points in a MIMO wireless communication system.

Among the constellation difference points illustrated in FIG. 3, the further the distance of the constellation difference point from the origin, the larger the effective distance based on Equation (6). And, the further the distance of the constellation difference point from the origin, the smaller the generating rate in Equation (7). In other words, a point far from the origin does not largely affect the calculation result of Equation (9). Therefore, according to the above characteristic, the number of constellation difference points may be reduced by decreasing the density of points at a region which is far from the origin. In other words, the constellation difference points are transformed so that the distance from the origin and the density of points are inversely proportional. For instance, the constellation difference points illustrated as FIG. 3 are transformed as illustrated in FIG. 4. Referring to FIG. 4, the number of constellation difference points is reduced from 49 to 17. That is, the number of constellation difference points is reduced by about 75%. Coordinates of the transformed constellation difference points illustrated as FIG. 4 are expressed as Equation (10).

$$\delta^{MDC} = \begin{Bmatrix} 0 & \sqrt{2} & j\sqrt{2} \\ \sqrt{2}+j\sqrt{2} & -\sqrt{2} & -\sqrt{2}+j\sqrt{2} \\ -j\sqrt{2} & -1-j\sqrt{2} & 1-j\sqrt{2} \\ 2/\sqrt{10} & j2/\sqrt{10} & 2/\sqrt{10}+j2/\sqrt{10} \\ -2/\sqrt{10} & -2/\sqrt{10}+j2/\sqrt{10} & -j2/\sqrt{10} \\ -2/\sqrt{10}-j2/\sqrt{10} & 2/\sqrt{10}-j2/\sqrt{10} & \end{Bmatrix} \quad (10)$$

In Equation (10), $\delta^{MDC}$ denotes a constellation difference domain vector consisting of the transformed constellation difference points as elements.

To use the transformed constellation difference points described in FIG. 4 and Equation (10), a generating rate per point should be applied to each point. The generating rate refers to the number of pairs of constellation points which make a corresponding constellation difference point or corresponding transformed constellation difference point be generated. That is, the generating rate is a type of weight. For instance, in case of $\delta_1$ and $\delta_4$ in FIG. 2B, the number of pairs which make $\delta_1$ and $\delta_4$ be generated is 4. Therefore, the generating rate of constellation difference point $\delta_1$ and $\delta_4$ is 4. The generating rate of a transformed constellation difference point is obtained by summing the generating rates of constellation difference points. The generating rate of each transformed constellation difference point is calculated based on Equation (11).

$$N(\delta^{MDC}(p)) = \sum_{|\delta^{MDC}(p)-\delta(q)|<r} \frac{N(\delta_{in}(q))}{N_{in}} \quad (11)$$

In Equation (11), $\delta^{MDC}$ denotes a constellation difference domain vector consisting of the transformed constellation difference points as elements, $\delta^{MDC}(p)$ denotes a p-th element of $\delta^{MDC}$, $N(\delta^{MDC}(p))$ denotes generating rates of $\delta^{MDC}(p)$, $\delta_{in}(q)$ denotes a q-th element of a constellation difference domain vector consisting of the constellation difference points as elements, $N(\delta_{in}(q))$ denotes generating rates of $\delta_{in}(q)$, r denotes a radius of a circle having a center of $\delta^{MDC}(p)$, and $N_{in}$ denotes the number of transformed constellation difference points which are apart within r from $\delta_{in}(q)$.

Figure 5:
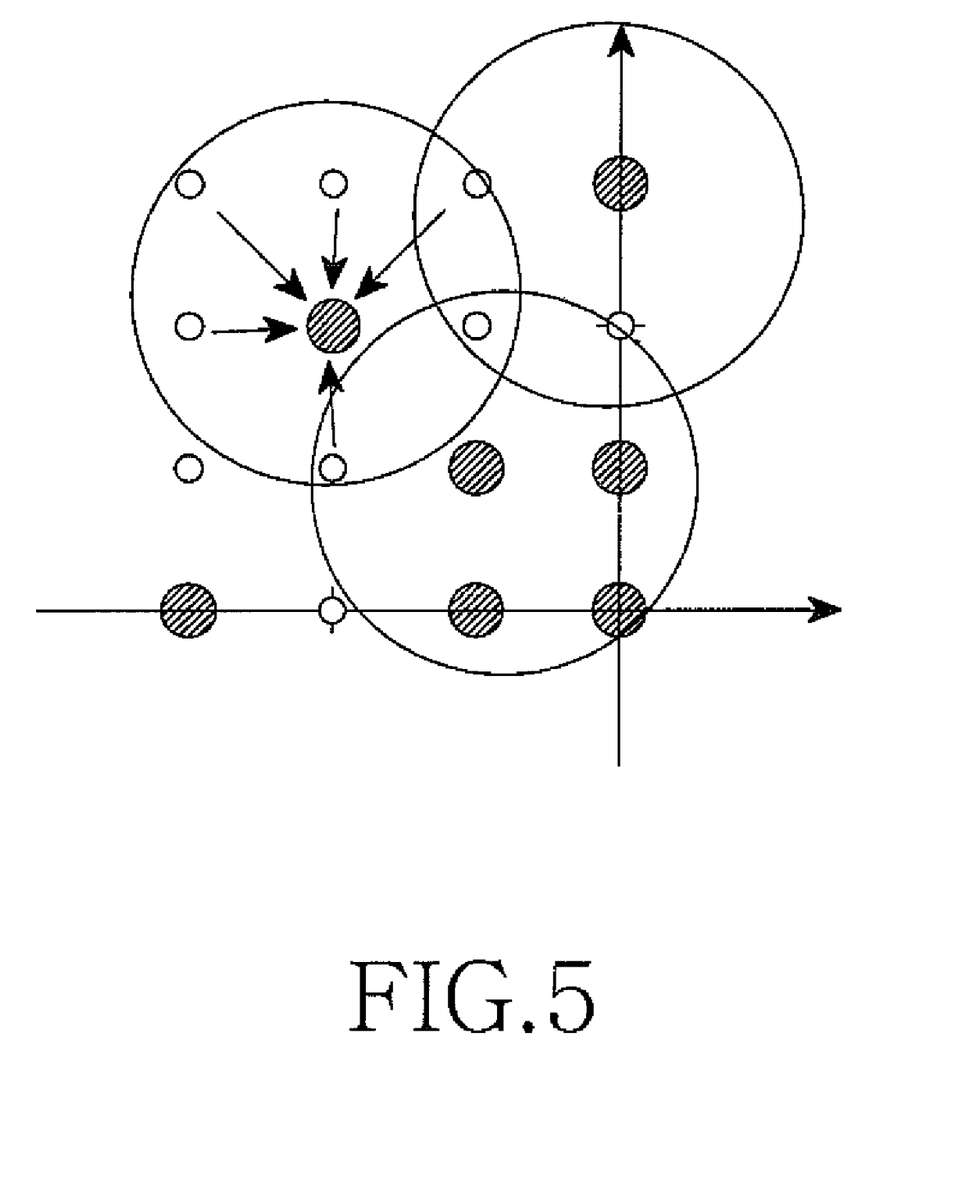
FIG. 5 is a diagram of a principle to calculate a generating rate of a constellation difference point in a MIMO wireless communication system.

FIG. 5 is a diagram illustrating an exemplary principle to calculate a generating rate of a constellation difference point in a MIMO wireless communication system according to an exemplary embodiment of the present invention.

Referring to FIG. 5, the generating rate calculated by Equation (11) is the sum of generating rates of constellation difference points within a circle having radius r wherein the center corresponds to the transformed constellation difference point. In case that a constellation difference point belongs to a plurality of circles, the generating rate of the constellation difference point is divided into the number of circles, then is summed. According to the rule above, the generating rates of each point in Equation (10) is calculated as Equation (12).

$$N(\delta^{MDC}) = \begin{Bmatrix} 16 & 21 & 21 \\ 18 & 21 & 18 \\ 21 & 18 & 18 \\ 12 & 12 & 9 \\ 12 & 9 & 12 \\ 9 & 9 & \end{Bmatrix} \quad (12)$$

In Equation (12), $\delta^{MDC}$ denotes a constellation difference domain vector consisting of the transformed constellation difference points as elements, and $N(\delta^{MDC})$ denotes a vector representing generating rates of each transformed constellation difference point.

Mostly, when $\hat{H}_{eff}$ is given and the SNR is determined, the instantaneous SER is calculated by applying the SNR to the SER of the Gaussian channel according to the modulation schemes. That is, the instantaneous SNR generated for the given channel is equal to the SNR of the Gaussian channel. Hence, exemplary embodiments of the present invention generate the per stream ESNR by reversing the above operation. Although the instantaneous per stream SER in the ML detection is calculated based on Equation (6), the per stream ESNR is not generated directly.

Expressions for computing the SER of the Gaussian channel according to the modulation schemes are well known and presented as Equation (13) using the inverse function which takes the SNR as the result value according to the modulation schemes.

$$SNR_{BPSK} = \frac{1}{2}\{Q^{-1}(P_{BPSK})\}^2 \quad (13)$$

$$SNR_{MPSK} \approx \frac{1}{2}\left\{\frac{1}{\sin\left(\frac{\pi}{M}\right)}Q^{-1}\left(\frac{P_{MPSK}}{2}\right)\right\}^2$$

$$SNR_{MQAM} \approx \frac{M-1}{3}\left\{Q^{-1}\left(\frac{1-\sqrt{1-P_{MQAM}}}{2\left(1-\frac{1}{\sqrt{M}}\right)}\right)\right\}^2$$

In Equation (13), $SNR_{(mod)}$ denotes the SNR of the corresponding modulation scheme, $P_{(mod)}$ denotes the SER of the corresponding modulation scheme, $Q^{-1}(\bullet)$ is the inverse function of the Gaussian Q function, and M denotes the modulation order.

By substituting the SER acquired from Equation (7) to Equation (13), the ESNR of the m-th stream of $M_{set}$ is generated, which is expressed as Equation (14).

$$SNR_{eff,I}^{ML}(m) = SER^{-1}(P_{s,I}(m|\hat{H}_{eff}),M_{set}(m)) + g_m(e,\hat{H}_{eff}) \quad (14)$$

In Equation (14), $SNR_{eff,I}^{ML}(m)$ denotes the ESNR of the m-th stream when the modulation scheme is $M_{set}$, $SER^{-1}(P_{s,I}(m|\hat{H}_{eff}),M_{set}(m))$ denotes the SER inverse function corresponding to the modulation scheme of the m-th stream, $M_{set}(m)$ denotes the modulation scheme of the m-th stream, and $g_m(e,\hat{H}_{eff})$ denotes the compensation value of the error due to the effective channel matrix estimation error.

Now, an exemplary structure and operation of a receiving end for determining the per stream ESNR and the MCS level are explained in detail by referring to the drawings.

Figure 6:
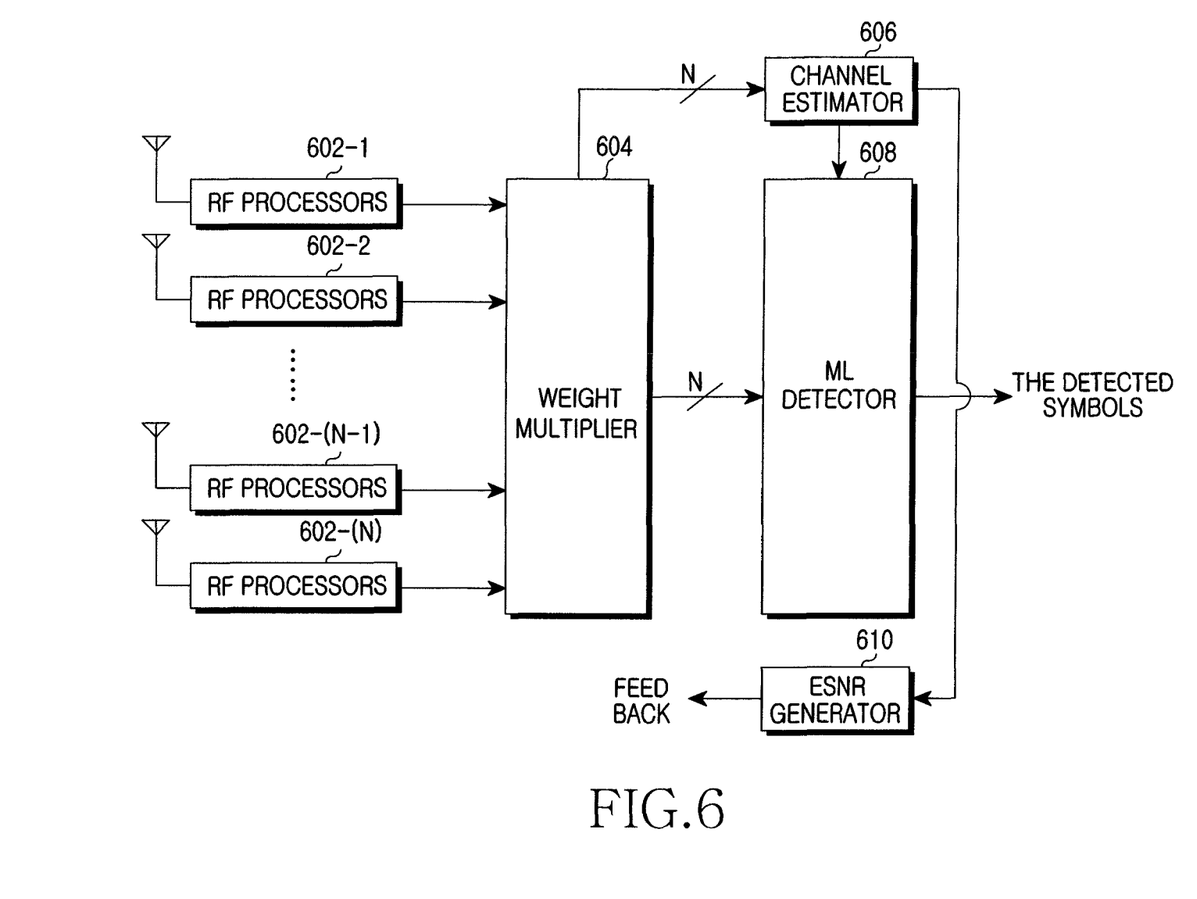
FIG. 6 is a block diagram of a receiving end in a MIMO wireless communication system according to an exemplary embodiment of the present invention.

FIG. 6 is a block diagram of a receiving end in a MIMO wireless communication system according to an exemplary embodiment of the present invention.

The receiving end of FIG. 6 includes a plurality of Radio Frequency (RF) processors 602-1 through 602-N, a weight multiplier 604, a channel estimator 606, an ML detector 608, and an ESNR generator 610.

The RF processors 602-1 through 602-N convert an RF signal received on the corresponding antenna into a baseband signal. The weight multiplier 604 multiplies the received symbol vector by the weight matrix for the receive beamforming. The channel estimator 606 estimates the channel using a pre-designated receive signal, for example using a pilot signal. The channel estimator 606 constitutes the effective channel matrix by taking account of the signal processing on the transmitted symbol vector in the transmitting end and the signal processing on the received symbol vector in the receiving end. For example, the effective channel matrix can be acquired by multiplying the transmitter weight matrix, the transmitter power allocation matrix, the channel matrix, and the receiver weight matrix as expressed in Equation (1). The channel estimator 606 calculates and provides the effective channel matrix and the average noise power of the channel to the ESNR generator 610.

The ML detector 608 estimates the transmit symbol vector from the received symbol vector using the ML detection. Specifically, the ML detector 608 estimates the transmit symbol vector based on Equation (2). The ESNR generator 610 generates the per stream ESNR according to exemplary embodiments of the present invention. The structure and the functions of the ESNR generator 610 will be described by referring to FIG. 7.

Figure 7:
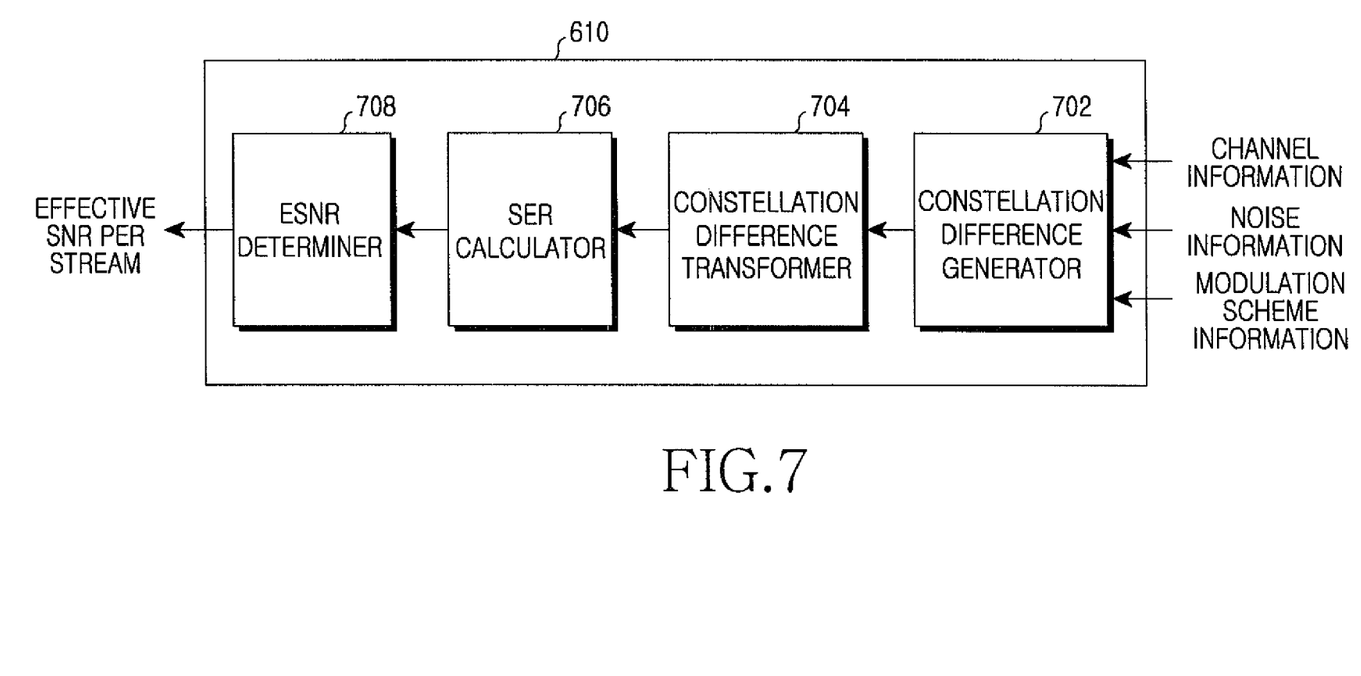
FIG. 7 is a detailed block diagram of an ESNR generator in a MIMO wireless communication system according to an exemplary embodiment of the present invention.

FIG. 7 is a detailed block diagram of an ESNR generator 610 in a MIMO wireless communication system according to an exemplary embodiment of the present invention.

The ESNR generator 610 of FIG. 7 includes a constellation difference generator 702, a constellation difference transformer 704, an SER calculator 706, and an ESNR determiner 708.

The constellation difference generator 702 converts a constellation domain representing values of symbols into a constellation difference domain representing values of distance between symbols. That is, the constellation difference generator 702 generates coordinates of constellation difference points. For instance, constellation difference points according to 16-QAM may be generated as illustrated in FIG. 3.

The constellation difference transformer 704 reduces the number of constellation difference points by transforming the constellation difference points generated by the constellation difference generator 702 to decrease the amount of necessary computation by the SER calculator 706. Herein, transformation of the constellation difference points is performed under the condition expressed by Equation (9). That is, the transformation of the constellation difference points is performed under the condition that the number of points is minimized within an allowable error rate per stream. For instance, constellation difference points of 16-QAM as illustrated in FIG. 3 are transformed as illustrated in FIG. 4, wherein the coordinates of transformed constellation difference points are expressed as Equation (10). Herein, each transformed constellation difference point has a generating rate. For instance, the generating rate is calculated using Equation (11). And, the generating rates for each transformed constellation difference point of 16-QAM as illustrated in FIG. 3 are expressed as Equation (12).

The SER calculator 706 determines the per stream SERs using the transformed constellation difference points and the generating rate for each point. For instance, the SER calculator 706 determines the per stream SERs using Equation (7).

The ESNR determiner 708 determines the per stream ESNRs by using the per stream SERs. Specifically, the ESNR determiner 708 converts the per stream SERs calculated at the SER calculator 706 into the per stream ESNRs using the SER inverse function, and compensates the per stream ESNRs for error. The error may include an error due to effective channel matrix estimation error and so on. For example, the SER inverse function may be an equation expressed in Equation (13). When expressing an operation of the ESNR determiner 708 in Equation (13), the operation of the ESNR determiner 708 is expressed as Equation (14).

The per stream ESNRs generated as above are fed back to the transmitting end and used for the transmitting end to schedule and determine the MCS level of the transmit signal. Accordingly, the receiving end further includes a feedback transmitter (not shown) for sending the feedback information to the transmitting end. The feedback transmitter transmits the per stream ESNRs information to the transmitting end.

Figure 8:
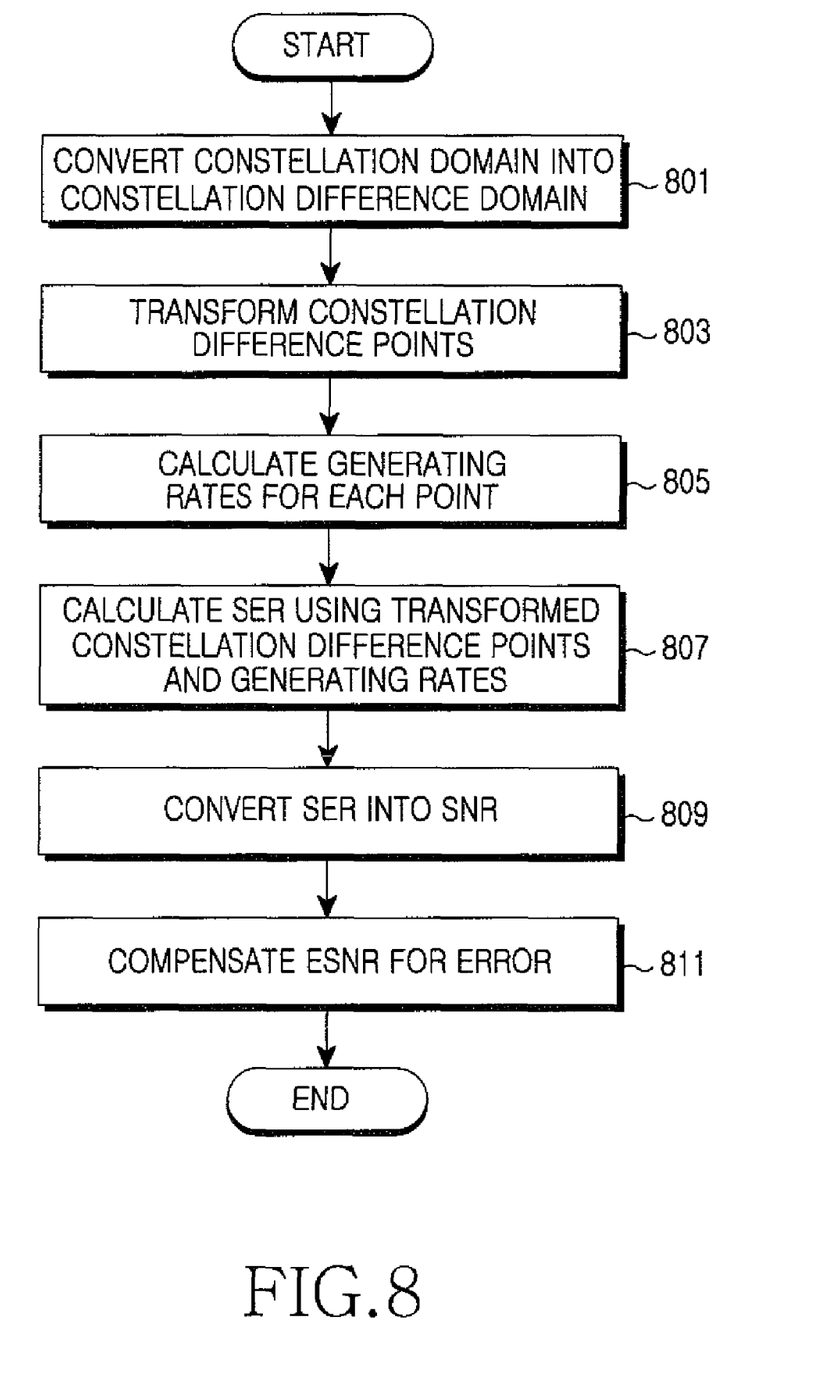
FIG. 8 is a flowchart illustrating a method for determining the per stream ESNR of a receiving end in a MIMO wireless communication system according to an exemplary embodiment of the present invention.

FIG. 8 is a flowchart of a method for a receiving end to determine the per stream ESNRs in an MIMO wireless communication system according to an exemplary embodiment of the present invention.

In step 801, the receiving end converts a constellation domain representing values of symbols into a constellation difference domain representing values of the distance between symbols. That is, the receiving end generates coordinates of constellation difference points. For instance, constellation difference points according to 16-QAM are generated as illustrated in FIG. 3.

In step 803, the receiving end reduces the number of the constellation difference points by transforming the constellation difference points to decrease the amount of computation of the SER calculation. Herein, transformation of the constellation difference points is performed under the condition as expressed in Equation (9). That is, the transformation of the constellation difference points is performed under the condition that the number of points is minimized within an allowable error rate per stream. For instance, constellation difference points of 16-QAM as illustrated in FIG. 3 are transformed as illustrated in FIG. 4. And, coordinates of transformed constellation difference points are expressed as Equation (10).

In step 805, the receiving end determines generating rates for each of the transformed constellation difference points. For instance, the generating rates are determined based on Equation (11). The generating rates for each transformed constellation difference point of 16-QAM as illustrated in FIG. 3 are expressed as Equation (12).

In step 807, the receiving end determines the per stream SERs by using the transformed constellation difference points and the generating rate for each point. For instance, the receiving end determines the per stream SERs based on Equation (7).

After determining the per stream SERs, the receiving end converts the per stream SERs into the per stream ESNRs by using an SER inverse function in step 809. For example, the receiving end converts the per stream SERs into the per stream ESNRs by using one of the equations expressed in Equation (13).

In step 811, the receiving end compensates the ESNR for error. The error may include an error due to effective channel matrix estimation error and so on. For instance, the receiving end generates the per stream ESNRs using Equation (14).

The generated per stream ESNRs are fed back to the transmitting end and used for the transmitting end to schedule and to determine the MCS level of the transmit signal. Next, the receiving end transmits the per stream ESNR information to the transmitting end.

In the light of the foregoing, the MIMO wireless communication system determines the per stream ESNR using the PER and the SER, to thus maximize the performance of the receiving end which performs the ML detection.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A receiving end apparatus in a Multiple-Input Multiple-Output (MIMO) wireless communication system, the apparatus comprising:
    a generator for generating constellation difference points by converting a constellation domain representing values of symbols into a constellation difference domain representing values of a distance between symbols;
    a calculator for calculating per stream Symbol Error Rates (SERs) by obtaining an upper boundary of the per stream SERs using a sum of the constellation differential points; and
    a determiner for determining per stream Effective Signal to Noise Ratios (ESNRs) using the per stream SERs.

2. The apparatus of claim 1, further comprising:
    a transformer for reducing a number of the constellation difference points by transforming the constellation difference points.

3. The apparatus of claim 2, wherein the transformer transforms the constellation difference points so that the number of points is minimized within an allowable error rate per stream.

4. The apparatus of claim 3, wherein the transformer transforms the constellation difference points so that a distance from an origin and a density of points are inversely proportional.

5. The apparatus of claim 2, wherein the transformer determines generating rates for each transformed constellation difference point.

6. The apparatus of claim 5, wherein the transformer determines a generating rate of a transformed constellation difference point by summing generating rates of constellation difference points within a circle having a center that is the transformed constellation difference point while dividing the a generating rate of a constellation difference point into a number of circles before summing when the constellation difference point belongs to a plurality of circles.

7. The apparatus of claim 1, wherein the calculator calculates the per stream SERs based on the following equation:

$$P_s(m \mid \hat{H}_{\mathit{eff}}) \leq \frac{1}{\prod_{i=1}^{N_T} M_{TX}(i)} \sum_{k=1}^{N(\delta_k)} k_m(\delta_k) \zeta(\delta_k) P(\delta_k \mid \hat{H}_{\mathit{eff}}) + f_m(e, \hat{H}_{\mathit{eff}}),$$

$$P(\delta_k \mid \hat{H}_{\mathit{eff}}) = Q\left(\sqrt{\frac{E_s}{2\sigma_n^2} \|\hat{H}_{\mathit{eff}} \delta_k\|_F^2}\right),$$

wherein $P_s(m|\hat{H}_{\mathit{eff}})$ denotes the SER of the m-th stream of $M_{set}$ when the effective channel matrix is $\hat{H}_{\mathit{eff}}$, $N_T$ denotes the number of transmit antennas, $M_{TX}(i)$ denotes a modulation order of the i-th stream, $\delta_k$ denotes a constellation difference domain vector, $N(\delta_k)$ denotes the number of constellation difference vectors, $k_m(\delta_k)$ denotes whether the m-th constellation difference vector is 0, if the m-th constellation difference vector is 0 then $k_m(\delta_k)$ is 0, $\zeta(\delta_k)$ denotes generating rates of $\delta_k$, $f_m(e, \hat{H}_{\mathit{eff}})$ denotes a compensation value of the error component of the m-th stream according to the estimation error of the effective channel matrix, $E_s$ denotes a sum of the transmit powers of the streams, and $\sigma_n^2$ denotes a noise power.

8. The apparatus of claim 1, wherein the determiner converts the per stream SER to the per stream ESNR based on an SER inverse function.

9. The apparatus of claim 8, wherein the determiner compensates the per stream ESNRs for error, after converting the per stream SERs into the per stream ESNRs.

10. The apparatus of claim 8, wherein the determiner determines the per stream ESNRs based on the following equation:

$$SNR_{\mathit{eff},i}^{ML}(m) = SER^{-1}(P_{s,i}(m|\hat{H}_{\mathit{eff}}), M_{set}(m)) + g_m(e, \hat{H}_{\mathit{eff}})$$

wherein $SNR_{\mathit{eff},i}^{ML}(m)$ denotes the ESNR of the m-th stream when the modulation scheme is $M_{set}$, $SER^{-1}(P_{s,i}(m|\hat{H}_{\mathit{eff}}), M_{set}(m))$ denotes the SER inverse function corresponding to the modulation scheme of the m-th stream, $M_{set}(m)$ denotes the modulation scheme of the m-th stream, and $g_m(e,\hat{H}_{\mathit{eff}})$ denotes the compensation value of the error due to the effective channel matrix estimation error.

11. The apparatus of claim 1, further comprising:
    an estimator for estimating a channel to a transmitting end using a receive signal, and for constituting an effective channel matrix according to a signal processing on transmit symbol vectors in the transmitting end and a signal processing on receive symbol vectors in the receiving end.

12. The apparatus of claim 1, further comprising:
    a transmitter for feeding back information of the per stream ESNRs to a transmitting end.

13. An operating method of a receiving end in a Multiple-Input Multiple-Output (MIMO) wireless communication system, the method comprising:
    generating constellation difference points by converting a constellation domain representing values of symbols into a constellation difference domain representing values of a distance between symbols;
    determining per stream Symbol Error Rates (SERs) by obtaining an upper boundary of the per stream SERs using a sum of the constellation differential points; and
    determining per stream Effective Signal to Noise Ratios (ESNRs) using the per stream SERs.

14. The method of claim 13, further comprising:
    reducing a number of the constellation difference points by transforming the constellation difference points.

15. The method of claim 14, wherein the transforming of the constellation difference points comprises minimizing the number of points within an allowable error rate per stream.

16. The method of claim 15, wherein the transforming of the constellation difference points comprises transforming so that a distance from an origin and a density of points are inversely proportional.

17. The method of claim 14, further comprising:
    determining generating rates for each transformed constellation difference point.

18. The method of claim 17, wherein the calculating of the generating rates for each transformed constellation difference point comprises:

determining a generating rate of a transformed constellation difference point by summing generating rates of constellation difference points within a circle having a center that is the transformed constellation difference point while dividing a generating rate of a constellation difference point into the number of circles before summing when the constellation difference point belongs to a plurality of circles.

19. The method of claim 13, wherein the per stream SERs are determined using the following equation:

$$P_s(m \mid \hat{H}_{eff}) \leq \frac{1}{\prod_{i=1}^{N_T} M_{TX}(i)} \sum_{k=1}^{N(\delta_k)} k_m(\delta_k)\zeta(\delta_k)P(\delta_k \mid \hat{H}_{eff}) + f_m(e, \hat{H}_{eff}),$$

$$P(\delta_k \mid \hat{H}_{eff}) = Q\left(\sqrt{\frac{E_s}{2\sigma_n^2}\|\hat{H}_{eff}\delta_k\|_F^2}\right),$$

wherein $P_s(m|\hat{H}_{eff})$ denotes the SER of the m-th stream of $M_{set}$ when the effective channel matrix is $\hat{H}_{eff}$, $N_T$ denotes the number of transmit antennas, $M_{TX}(i)$ denotes a modulation order of the i-th stream, $\delta_k$ denotes a constellation difference domain vector, $N(\delta_k)$ denotes the number of constellation difference vectors, $k_m(\delta_k)$ denotes whether the m-th constellation difference vector is 0, if the m-th constellation difference vector is 0 then $k_m(\delta_k)$ is 0, $\zeta(\delta_k)$ denotes generating rates of $\delta_k$, $f_m(e, \hat{H}_{eff})$ denotes a compensation value of the error component of the m-th stream according to the estimation error of the effective channel matrix, $E_s$ denotes a sum of the transmit powers of the streams, and $\sigma_n^2$ denotes a noise power.

20. The method of claim 13, wherein the determining the per stream ESNR, comprising:
converting the per stream SERs into the per stream ESNRs based on an SER inverse function.

21. The method of claim 20, wherein the determining of the per stream ESNR, comprises:
compensating the per stream ESNRs for error, after converting the per stream SERs into the per stream ESNRs.

22. The method of claim 21, wherein the per stream ESNRs are determined using the following equation:

$$SNR_{eff,i}^{ML}(m) = SER^{-1}(P_{s,i}(m|\hat{H}_{eff}), M_{set}(m)) + g_m(e, \hat{H}_{eff})$$

wherein $SNR_{eff,i}^{ML}(m)$ denotes the ESNR of the m-th stream when the modulation scheme is $M_{set}$, $SER^{-1}(P_{s,i}(m|\hat{H}_{eff}), M_{set}(m))$ denotes the SER inverse function corresponding to the modulation scheme of the m-th stream, $M_{set}(m)$ denotes the modulation scheme of the m-th stream, and $g_m(e, \hat{H}_{eff})$ denotes the compensation value of the error due to the effective channel matrix estimation error.

23. The method of claim 13, further comprising:
estimating a channel to a transmitting end using a receive signal; and
constituting an effective channel matrix according to a signal processing on transmit symbol vectors in the transmitting end and a signal processing on receive symbol vectors in the receiving end.

24. The method of claim 13, further comprising:
feeding back information of the per stream ESNRs to the transmitting end.

* * * * *